(12) United States Patent
Gangani et al.

(10) Patent No.: US 11,263,064 B2
(45) Date of Patent: Mar. 1, 2022

(54) METHODS AND APPARATUS TO FACILITATE IMPROVING PROCESSING OF MACHINE LEARNING PRIMITIVES

(71) Applicant: QUALCOMM Incorporated, San Diego, CA (US)

(72) Inventors: Hitendra Gangani, San Diego, CA (US); Balaji Calidas, San Diego, CA (US); Jeremy Williams, San Juan Capistrano, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 16/730,243

(22) Filed: Dec. 30, 2019

(65) Prior Publication Data

US 2021/0200608 A1 Jul. 1, 2021

(51) Int. Cl.

| G06F 9/44 | (2018.01) |
| G06F 9/54 | (2006.01) |
| G06F 9/48 | (2006.01) |
| G06N 20/00 | (2019.01) |
| G06K 9/62 | (2022.01) |
| G06T 15/00 | (2011.01) |
| G06F 9/38 | (2018.01) |

(52) U.S. Cl.
CPC ............ *G06F 9/544* (2013.01); *G06F 9/3877* (2013.01); *G06F 9/4881* (2013.01); *G06K 9/6212* (2013.01); *G06N 20/00* (2019.01); *G06T 15/005* (2013.01)

(58) Field of Classification Search
CPC ........................................................ G06F 9/544
USPC ...................................................... 719/312
See application file for complete search history.

(56) References Cited

U.S. PATENT DOCUMENTS

| 2013/0194286 A1* | 8/2013 | Bourd | G06F 9/5038 |
| | | | 345/545 |
| 2015/0070355 A1* | 3/2015 | Clarberg | G06T 15/80 |
| | | | 345/426 |
| 2015/0379663 A1* | 12/2015 | Gruber | G06T 1/20 |
| | | | 345/522 |

\* cited by examiner

*Primary Examiner* — Timothy A Mudrick
(74) *Attorney, Agent, or Firm* — Procopio, Cory, Hargreaves & Savitch LLP

(57) ABSTRACT

The present disclosure relates to methods and apparatus for machine learning processing. For example, disclosed techniques facilitate improving execution of machine learning primitives. Aspects of the present disclosure may store a command stream generated by an application in a buffer, the command stream including a plurality of machine learning primitives for execution by a graphics processor. Further, aspects of the present disclosure identify, after receiving a request from the application to finalize the buffer, two or more machine learning primitives of the buffer that may be replaced with a fused shader kernel. Additionally, aspects of the present disclosure may store the fused shader kernel in the buffer to generate a fused command buffer.

28 Claims, 5 Drawing Sheets

METHODS AND APPARATUS TO FACILITATE IMPROVING PROCESSING OF MACHINE LEARNING PRIMITIVES

TECHNICAL FIELD

The present disclosure relates generally to processing systems and, more particularly, to one or more techniques for machine learning processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an application processor, a CPU, a graphics processor, a GPU, a display processor, a display processing unit (DPU), or a video processor. The apparatus can store a command stream generated by an application in a buffer, the command stream including a plurality of machine learning primitives for execution by a graphics processor. Additionally, the apparatus can identify, after receiving a request from the application to finalize the buffer, two or more machine learning primitives of the buffer that may be replaced with a fused shader kernel. Further, the apparatus can store the fused shader kernel in the buffer to generate a fused command buffer.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
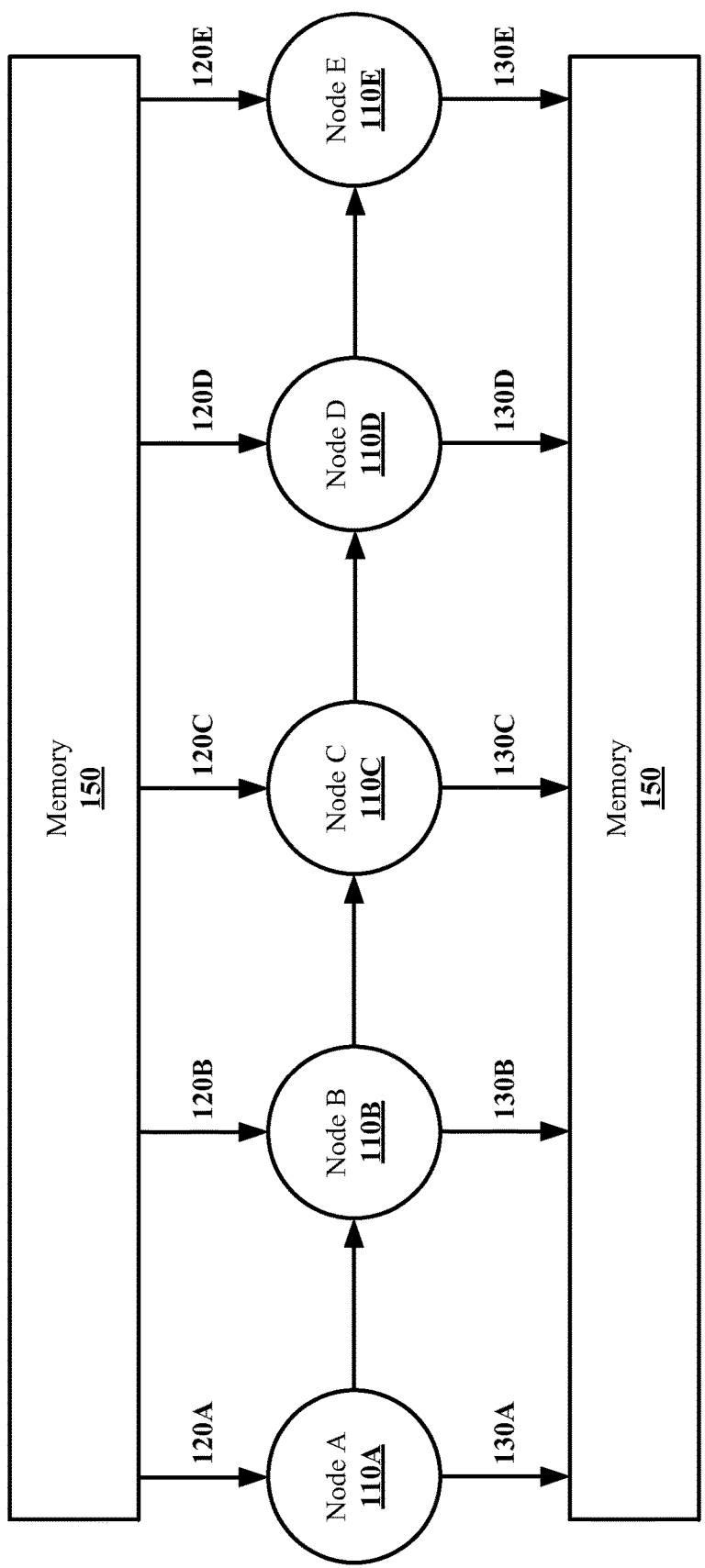
FIG. 1 depicts an example graph structure including a sequence of nodes representing machine learning primitives.

In general, examples disclosed herein provide techniques for improving GPU machine learning acceleration via fusion of machine learning primitives. In some examples, a graphics processor (e.g., a GPU) may be configured to execute graphics operations to render one or more graphics primitives, for example, to a display. In some examples, the graphics processor may additionally or alternatively be configured to execute operations (e.g., machine learning operations, compute operations, and/or mathematical operations) to execute one or more machine learning (ML) primitives. For example, the graphics processor may be configured to execute general-purpose "shader programs" in order to perform operations other than graphics-related operations. Due to the relative highly parallel nature of graphics processor processing elements, some types of calculations may be more efficiently performed by a graphics processor than, for example, by an application processor (e.g., a CPU).

As an illustrative example, an application, such as a video game, being executed via an application processor may include a graphics engine to facilitate the rendering of graphics (e.g., by providing graphics operations to a graphics processor) and a game difficulty engine to determine a level of difficulty of gameplay to provide to a user. In some examples, the game difficulty engine may update (e.g., periodically, aperiodically, event-based, and/or as a one-time event) the level of difficulty of gameplay based on player actions and/or events. For example, if the player is having difficulty advancing beyond an obstacle, the game difficulty engine may determine to lower the level of difficulty of gameplay.

In some examples, the game difficulty engine may use machine learning techniques to determine the appropriate level of gameplay difficulty to provide to the player. In some examples, the application (and/or the application processor) may offload some functionality of the game difficulty engine to the graphics processor. For example, the application may generate ML primitives, and the application processor may issue the ML primitives to the graphics processor for processing. Examples of ML primitives include convolution operations, general matrix multiply (GEMM) operations, pooling operations, batch normalization operations, image processing operations, etc. The graphics processor may then execute the ML primitives and provide the result(s) to the application (and/or the application processor) for further processing.

In some examples, to allow the application processor and the graphics processor to communicate with each other, the application processor may include a graphics driver. For example, when the application processor offloads processing tasks (e.g., ML primitives) to the graphics processor, the application processor may offload such processing tasks to the graphics processor via the graphics driver. The graphics driver may then convert the processing tasks (e.g., the ML primitives) into operations (e.g., shader kernels) that the graphics processor can execute.

For example, the application executing on the application processor may issue a sequence of ML primitives to the graphics driver. The graphics driver may receive and record the sequence of ML primitives in a command buffer. The application may then send a signal to the graphics driver indicating that the application is done issuing ML primitives to the graphics driver and that the graphics driver may finalize the command buffer. After receiving the signal to finalize the command buffer, the graphics driver may close the command buffer to stop recording to the command buffer. The graphics driver may also convert the ML primitives recorded in the command buffer to one or more shader kernels (sometimes referred to as "kernels," "shader programs" or "operations") for the graphics processor to perform to execute the ML primitives. The graphics driver may then "dispatch" the command buffer by making the one or more shader kernels available to the graphics processor for executing. For example, the graphics driver may make the one or more shader kernels in the command buffer available to the graphics processor and/or may provide information to the graphics processor for accessing the command buffer. As used herein, the term "shader kernel" (and its variants) refers to program code and/or a sequence of operations that defines a task or function to be executed by the graphics processor. For example, as part of the closing of the command buffer process, the graphics driver may identify an ML convolution primitive in the command buffer and convert the ML convolution primitive to a shader kernel that defines the tasks to be performed by the graphics processor to execute the ML convolution primitive.

In some examples, after the graphics driver dispatches the command buffer to the graphics processor, the graphics processor starts executing the shader kernels of the command buffer. For example, the graphics processor may receive a shader kernel identifying one or more operations to perform. In some examples, executing a shader kernel may include performing one or more mathematical operations on input data. In some such examples, the graphics processor may access (e.g., receive and/or retrieve) the input data from a memory (e.g., a global memory) that is accessible to the application processor and to the graphics processor. One or more processing elements of the graphics processor may then perform the one or more mathematical operations on the input data and generate output data. The graphics processor may then store the generated output data at the memory (e.g., the global memory).

FIG. 1 illustrates an example graph structure 100 depicting a sequence of ML primitives that may be accelerated via a graphics processor. In the illustrated example of FIG. 1, the graph structure 100 includes five example nodes A, B, C, D, E, which may be referred to as nodes 110A to 110E, respectively. As shown in FIG. 1, each of the nodes 110A to 110E receives respective input data 120A to 120E and generates respective output data 130A to 130E.

In the illustrated example, each node represents a shader kernel. For example, execution of the first node 110A includes the graphics processor receiving the input data 120A, performing the one or more operations associated with a respective shader kernel, and generating the output data 130A. Furthermore, as shown in FIG. 1, the execution of the nodes 110A to 110E are performed in sequence. For example, the first node 110A is executed, which is followed by the execution of the second node 110B, which is followed by the execution of the third node 110C, which is followed by the execution of the fourth node 110D, and which is followed by the execution of the fifth node 110E. As each node corresponds to a shader kernel, it should be appreciated that in some examples, there may a cost (e.g., a kernel launch latency) associated with executing each node. For example, to execute the ML primitives of the graph structure 100, the shader kernel represented by the first node 110A is launched and executed, then the shader kernel represented by the second node 110B is launched and executed, etc.

In the illustrated example, the input data 120A to 120E is read from a memory 150 and the output data 130A to 130E is stored at the memory 150. The memory 150 may be any memory that is accessible to an application processor and to the graphics processor. For example, the application processor may store ML data at the memory 150, which may be used by the graphics processor as input data to execute the shader kernels represented by the graph structure 100. The graphics processor may then store the output data generated by executing the shader kernels at the memory 150, which may be used by the application processor for further processing. Thus, it should be appreciated that in some examples, there may be a cost (e.g., a memory access latency) associated with accessing (e.g., reading from and/or writing to) data at the global memory.

Example techniques disclosed herein facilitate improving execution of ML primitives via fusion of shader kernels. As used herein, the term "fusion" (and variants thereof) refers to combining two or more ML primitives into a single shader kernel. For example, two ML primitives recorded in a command buffer may be fused (or combined) into one shader kernel that may be provided to the graphics processor for execution. By fusing two or more ML primitives into a single fused kernel, example techniques enable reducing latency associated with kernel launching as fewer shader kernels may be launched. Furthermore, disclosed techniques enable one or more intermediate results to be stored in a local memory of the graphics processor rather than to the global memory. As used herein, the term "intermediate results" (and variants thereof) refers to output data generated by a shader kernel that is used by a subsequent shader kernel as input data. For example, referring to the graph structure 100 of FIG. 1, the output data 130B generated by executing the shader kernel associated with the second node 110B may be used as the input data 120C used for the execution of the shader kernel associated with the third node 110C. By storing the intermediate results in the local memory, access to the intermediate results may be performed relatively faster than accessing the data from the global memory, which may facilitate improving execution of the ML primitives.

In some examples, to facilitate the fusing of ML primitives, example techniques disclosed herein enable the graphics driver to modify the ML primitives included in the command buffer. For example, after the graphics driver receives the request to finalize the command buffer and before the graphics driver dispatches the command buffer to the graphics processor for execution, the graphics driver may be configured to parse the plurality of ML primitives of the command buffer to determine whether the ML primitives include two or more ML primitives that may be fused. In some examples, the fusing of the two or more ML primitives may facilitate reducing or eliminating inefficiencies associated with the execution of the ML primitives, such as kernel launch latency and/or or memory access latency.

In some examples, the receiving, by the graphics driver, of the request to finalize the command buffer may trigger the graphics driver to perform the fusion operations of the ML primitives of the command buffer. In some examples, the graphics driver may perform the fusion operations prior to dispatching the command buffer to the graphics processor.

Thus, it should be appreciated that a window of opportunity for improving the execution of ML primitives by the graphics driver exists between when the graphics driver receives the request to finalize the command buffer and when the graphics driver dispatches the command buffer to the graphics processor for execution.

As used herein, the term "command stream" refers to a stream of commands issued by an application executing on an application processor, such as a central processing unit. For example, the command stream may include a plurality of ML primitives issued by the application for execution by the graphics processor. The machine learning primitives are typically the basic building blocks for machine learning processing and may include convolution operations, general matrix multiply (GEMM) operations, pooling operations, batch normalization operations, image processing operations, etc.

As used herein, the terms "finalizing the command buffer" or "closing the command buffer" (or variants thereof) may be used interchangeably and refer to the process of marking a command buffer as closed to prevent further recording of commands to the command buffer and converting the ML primitives of the command buffer to shader kernels for execution by the graphics processor. In some examples, disclosed techniques may convert two or more ML primitives of the command buffer into a fused shader kernel for execution by the graphics processor. In some examples, disclosed techniques may convert one ML primitive into a shader kernel for execution by the graphics processor. As used herein, finalizing the command buffer also includes the triggering of the fusion process to determine whether two or more ML primitives of the command buffer may be fused and converted into a single shader kernel. For example, the graphics driver may parse the ML primitives of the command buffer and identify one or more opportunities for performing fusion of ML primitives. When performing fusion of ML primitives, the graphics driver may replace the identified two or more ML primitives with a fused ML primitive. In some such examples, the fused ML primitive performs the tasks or functions of the respective identified two or more ML primitives. The graphics driver may then convert the fused ML primitive into a fused shader kernel representing the tasks or functions of the respective ML primitives. However, it should be appreciated that in some examples, the graphics driver may replace the identified two or more ML primitives with a fused shader kernel.

As disclosed herein, in some examples, the graphics driver may be configured to use a data structure (e.g., a look-up table, a library, etc.) to convert an ML primitive (or a fused ML primitive) into a shader kernel (or a fused shader kernel). For example, the graphics driver may access an ML library that includes a look-up table that maps an ML primitive to a respective shader kernel. In some examples, the ML library may include mappings that are generated for and optimized for the hardware of the graphics processor. For example, the graphics processor may include on-chip memory that may be associated with a relatively lower latency than accessing data at the global memory. In some such examples, execution of a shader kernel (or a fused shader kernel) mapped via the ML library may include storing output data at the on-chip memory for relatively faster execution of the respective shader kernel. Furthermore, in some examples, reading input data may be relatively faster when executing a shader kernel when the input data is available at the on-chip memory instead of the global memory.

For example, executing a shader kernel may include loading input data from a first memory, performing one or more computational tasks associated with the input data to generate output data, and storing the generated output data at the first memory. In some such examples, the first memory may be the global memory that is shared between, for example, an application processor executing the application and the graphics processor executing the shader kernels. To access data at the first memory, the graphics processor may be configured to share a memory bus with other components of a computing device, such as the application processor, which may result in a more limited available bandwidth. In some examples, during the parsing (or traversing) of the plurality of ML primitives of the command buffer, the graphics driver may be configured to determine that an output of a first ML primitive is used as an input of a second ML primitive.

In some such examples, the graphics driver may be configured to identify an inefficiency of executing the ML primitives of the command buffer based on the latency associated with storing the output of the first ML primitive at the global memory and then loading the input of the second ML primitive (e.g., the output of the first ML primitive) from the global memory to execute the second ML primitive. To facilitate reducing (or eliminating) the identified inefficiency, the graphics driver may be configured to modify the memory used for storing the output of the first ML primitive and for loading the input of the second ML primitive from the first memory to a second memory (e.g., a graphics processor memory). In some such examples, accessing (e.g., loading and/or storing) data at the second memory may be associated with a relatively lower latency than accessing data from the first memory. For example, the second memory (e.g., the graphics processor memory) may be an on-chip memory that is on-chip with the graphics processor and in relative close proximity to the components of the graphics processor (e.g., the processing elements of the graphics processor executing the shader kernels). In some examples, the second memory may be associated with a dedicated memory bus within the graphics processor, which may facilitate reducing latency associated with accessing data at the second memory. It should be appreciated that in the above example, modifying the memory used for storing the output of the first ML primitive and for loading the input of the second ML primitive from the first memory (e.g., the global memory) to the second memory (e.g., the graphics processor memory) may conserve power resources (e.g., associated with accessing data from the first memory) and improve execution of the shader kernels and associated ML primitives by the graphics processor.

In some examples, the graphics driver may be configured to process a sequence of ML primitives of the command buffer and determine that two or more ML primitives may be replaced with a fused shader kernel. In some such examples, the execution of the fused shader kernel may reduce (or eliminate) the accessing of intermediate result(s) at the global memory, which may be associated with the performing of resource costly load operations and/or store operations. For example, the graphics driver may be configured to parse the plurality of ML primitives of the command buffer and identify a sequence of three ML primitives that may be replaced with a fused shader kernel. For example, the first ML primitive of the sequence of ML primitives may perform a multiplication of a first input and a second input and store a first output generated by the first ML primitive at the global memory, the second ML primitive of the sequence of ML primitives may perform a multiplication of a third input and fourth input and store a second output generated by the second ML primitive at the global memory, and the third ML primitive of the sequence of ML primitives may aggregate (or sum) the first output and the second output and store a third output generated by the third ML primitive at the global memory. It should be appreciated that in the above example, the first output and the second output are intermediate results that are used for the execution of the third ML primitive. In some such examples, the graphics driver may be configured to identify an inefficiency in the execution of the ML primitives of the command buffer based on the performing of the three identified ML primitives and the respective store operations and load operations associated with the intermediate results (e.g., the outputs generated by the first ML primitive and the second ML primitive). To facilitate reducing (or eliminating) the identified inefficiency, the graphics driver may be configured to replace the sequence of three ML primitives with a fused shader kernel. For example, the fused shader kernel may be associated with a computational task (e.g., a dot-product computation) that loads the first input and the second input (e.g., associated with the executing of the first ML primitive), loads the second input and the third input (e.g., associated with the executing of the second ML primitive), and generates and stores (e.g., at the global memory) an output that corresponds to the third output generated by the third ML primitive without having to generate and store any intermediate results. It should be appreciated that in the above example, modifying the ML primitives of the command buffer by replacing a sequence of ML primitives with a fused shader kernel may conserve power resources (e.g., associated with accessing intermediate results) and may improve execution performance of the ML primitives of the command buffer.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein, one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processor, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (e.g., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for improving acceleration of ML primitives via a graphics processor. Example techniques may improve performance and reduce power consumption by performing fusion of two or more ML primitives recorded in a command buffer. For example, disclosed examples may parse ML primitives recorded in the command buffer and identify two or more sequential ML primitives that may be replaced with a fused ML primitive and/or a fused shader kernel. Disclosed examples may then replace the identified two or more sequential ML primitives with the fused ML primitive and/or fused shader kernel. In some examples, disclosed techniques may replace memory access locations from a global memory to a memory local to the graphics processor. Thus, it should be appreciated that examples disclosed herein provide techniques for reducing the load on a communication interface (e.g., a bus), and/or reducing the load of a processing unit (e.g., any processing unit configured to perform one or more techniques disclosed herein, such as an application processor, a CPU, a graphics processor, a GPU, a DPU, and the like). For example, examples disclosed herein employ techniques for reducing kernel launch latency associated with launching shader kernels and/or reducing memory access latency associated with accessing data from a memory. Furthermore, this disclosure describes techniques for system processing in any device that utilizes machine learning techniques. Other example benefits are described throughout this disclosure.

Figure 2:
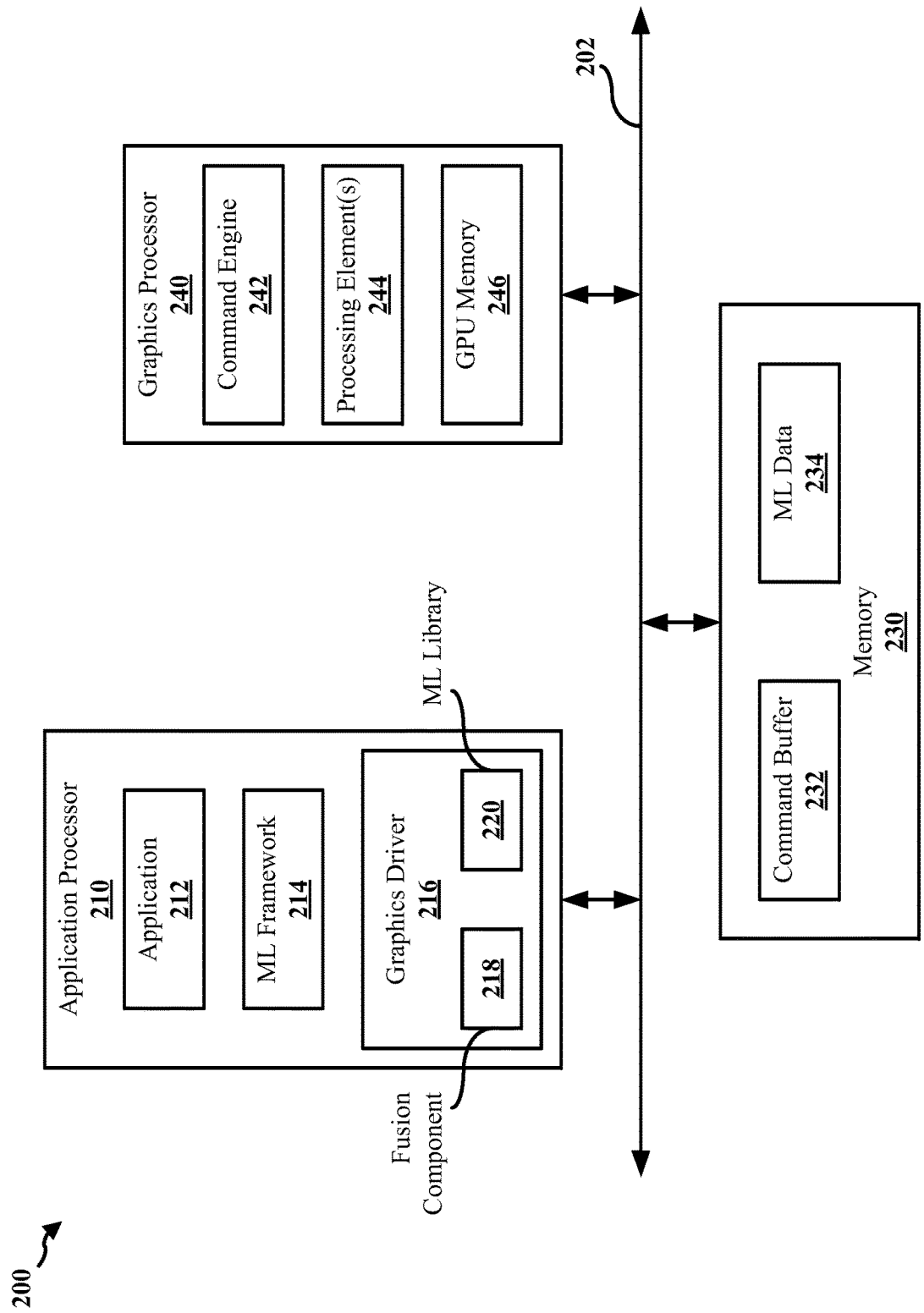
FIG. 2 is a block diagram that illustrates an example device, in accordance with one or more techniques of this disclosure.

FIG. 2 is a block diagram illustrating components of a device 200, in accordance with aspects of this disclosure. In the illustrated example of FIG. 2, the device 200 includes an application processor 210, memory 230, and a graphics processor 240. As shown in FIG. 2, the example application processor 210, the example memory 230, and the example graphics processor 240 are in communication via an example bus 202. The example bus 202 may be implemented using any combination of bus structures and/or bus protocols.

In the illustrated example of FIG. 2, the application processor 210 may include one or more processors that are configured to execute an application 212, an ML framework 214, and a graphics driver 216. The example memory 230 of FIG. 2 may be configured to include a command buffer 232 and an ML data buffer 234. In the illustrated example of FIG. 2, the graphics processor 240 may include one or more processors that are configured to execute a command engine 242, one or more processing elements 244, and a GPU memory 246. In some examples, the application processor 210 may be configured to execute instructions that cause the application processor 210 to perform one or more of the example techniques disclosed herein. In some examples, the memory 230 may also instructions that, when executed, cause the application processor 210 and/or the graphics processor 240 to perform one or more of the example techniques disclosed herein. In some examples, the graphics processor 240 may be configured to execute instructions that cause the graphics processor 240 to perform one or more of the example techniques disclosed herein.

In the illustrated example, the application processor 210 may be configured to execute the application 212. The application 212 may be an application that uses the graphics processor 240 to accelerate one or more ML primitives. For example, the application 212 may issue commands that cause the graphics processor 240 to perform one or more computational jobs associated with an ML primitive. In some examples, the application 212 may store data used for the processing of the ML primitives in the ML data buffer 234 of the memory 230. In some examples, the application 212 may issue a request to finalize a command buffer when the application 212 is done issuing commands.

In the illustrated example, the ML framework 214 may include one or more software frameworks that may be used with the application 212. In some examples, the ML framework 214 may translate the commands received from the application 212 into a format that is consumable by the graphics driver 216 for providing to the graphics processor 240. For example, the ML framework 214 may translate the commands into ML primitives. In some examples, the ML framework 214 may include one or more application program interfaces (APIs). Examples of the ML framework 214 may include VULCANML, DIRECTML, OPENCL ML, and other ML frameworks. In some examples, the ML framework 214 may be provided to the application 212 by an operating system executing on the application processor 210.

In some examples, the ML framework 214 may be configured to combine two or more of the commands received from the application 212 into an ML primitive. In some such examples, the ML framework 214 may be configured to perform the combining of the two or more commands based on the high-level code that defines each command. As used herein, the term "high-level code" (and variants thereof) refers to code created using a high-level programming language, such as C++, JAVA, PYTHON, VISUAL BASIC, or the like. The high-level code may be created by a programmer and used to design the application 212. In some such examples, the ML framework 214 may include preconfigured libraries and APIs for translating the commands issued by the application 212 into ML primitives. That is, while the ML framework 214 may include techniques for combining two or more commands, the techniques are performed at a high-level and are not based on the hardware components of the graphics processor 240.

In the illustrated example, the graphics driver 216 may be configured to allow the application processor 210 and the graphics processor 240 to communicate with one another. For example, when the application processor 210 offloads an operation to the graphics processor 240, the application processor 210 offloads such operations to the graphics processor 240 via the graphics driver 216. The graphics driver 216 may then instruct the graphics processor 240 with when to execute shader kernels and instruct the graphics processor 240 with where to retrieve the ML data needed for the shader kernels (e.g., from where to load the ML data from the ML data buffer 234).

In some examples, the graphics driver 216 may receive ML primitives issued by the application 212 and/or the ML framework 214. The graphics driver 216 may create a command buffer to record ML primitives issued by a respective application. For example, the graphics driver 216 may create the command buffer 232 at the memory 230 to record ML primitives issued by the application 212. Thus, it should be appreciated that although the example memory 230 of FIG. 2 includes one command buffer, in other examples, the memory 230 may include any suitable quantity of command buffers based on, for example, the quantity of applications that issue ML primitives to the graphics driver 216. For example, if two different applications 212 are issuing ML primitives to the graphics driver 216, the graphics driver 216 may create two different command buffers 232 at the memory 230 for recording the ML primitives issued by each respective application.

In some examples, the graphics driver 216 may continue recording ML primitives in the command buffer 232 until the graphics driver 216 receives a request to finalize the command buffer 232. In some such examples, the graphics driver 216 may end recording ML primitives to the command buffer 232 and may then map the ML primitives in the command buffer 232 to respective shader kernels for execution by the graphics processor 240. The graphics driver 216 may then dispatch the command buffer 232 to the graphics processor 240 for accelerating the ML primitives issued by the application 212 by executing the shader kernels of the command buffer 232. In some examples, when the graphics driver 216 dispatches the command buffer 232 to the graphics processor 240, the graphics driver 216 may provide the shader kernels of the command buffer 232 to the graphics processor 240. In some examples, when the graphics driver 216 dispatches the command buffer 232 to the graphics processor 240, the graphics driver 216 may provide the graphics processor 240 information for accessing the shader kernels. For example, the shader kernels may be stored at the memory 230 and the graphics driver 216 may instruct the graphics processor 240 with where to retrieve the shader kernel needed for execution.

In the illustrated example of FIG. 2, the example graphics driver 216 includes an example fusion component 218 and an example ML library 220. The example fusion component 218 may be configured to parse the ML primitives in the command buffer 232 and to identify two or more ML primitives to fuse. For example, the fusion component 218 may be configured to parse the ML primitives in the command buffer 232 and identify a convolution primitive followed by a batch normalization primitive. In some such examples, the fusion component 218 may be configured to replace the convolution primitive and the batch normalization primitive with a fused shader kernel that performs the tasks or functions associated with executing the convolution primitive and the batch normalization primitive. It should be appreciated that in some examples, the fusion component 218 may replace an ML primitive with a shader kernel by replacing one or more commands for executing the ML primitive with one or more commands for executing the shader kernel.

In some examples, the fusion component 218 may parse the ML primitives in the command buffer 232 and identify instances in which a first ML primitive is directly followed by a second ML primitive (e.g., the first ML primitive and the second ML primitive are executed back-to-back) and in which the output generated by the first ML primitive is used by the second ML primitive as an input. In some such examples, the fusion component 218 may be configured to replace the first primitive with a respective shader kernel that stores the output at the GPU memory 246 of the graphics processor 240. The fusion component 218 may also be configured to replace the second primitive with a respective shader kernel that retrieves input data from the GPU memory 246.

In the illustrated example, to facilitate performing the replacing of ML primitives with shader kernels (or fused shader kernels), the fusion component 218 accesses the ML library 220. The example ML library 220 includes one or more data structures (e.g., a look-up table, a file, a data store, etc.) that maps one or more ML primitives to respective shader kernels. In some examples, the shader kernels included in the ML library 220 may be pre-compiled shader kernels. In some examples, the ML library 220 may be populated with mappings that are based on characteristics of the graphics processor 240, such as hardware components of the graphics processor 240. For example, one or more shader kernels included in the ML library 220 may be based on whether the graphics processor 240 includes a local memory, such as the GPU memory 246. In some such examples in which the graphics processor 240 includes the local memory, one or more shader kernels may be configured to read input data from the local memory and/or store output data to the local memory.

In some examples, the ML library 220 may include mappings to shader kernels that include low-level code written in a machine or assembly programming language that can be executed by the graphics processor 240. In some examples, the ML library 220 may include shader kernels created to fuse execution of two or more ML primitives. For example, a fused shader kernel may facilitate executing the tasks or functions associated with a first ML primitive (e.g., a convolution primitive) and executing the tasks or functions associated with a second ML primitive (e.g., a batch normalization primitive). In some such examples, the first ML primitive and the second ML primitive may be sequential primitives that are executed back-to-back. For example, the first ML primitive may be executed, which is then followed by the second ML primitive. As described above, employing fused shader kernels facilitates reducing memory access latencies by enabling the graphics processor 240 to read from and/or write to a local memory (e.g., the GPU memory 246) associated with a lower memory access latency than the global memory (e.g., the memory 230). For example, intermediate results generated by execution of the tasks or functions associated with the first ML primitive may be stored in the local memory and then read from the local memory for execution of the tasks or functions associated with the second ML primitive. Although the above example includes fusing two ML primitives, it should be appreciated that in other examples, any suitable quantity of sequential ML primitives that are executed back-to-back may be combined into a fused shader kernel.

It should be appreciated that by employing fused shader kernels, disclosed techniques enable reducing kernel launch latencies associated with executing the ML primitives of the command buffer 232. For example, instead of incurring a first kernel launch penalty for launching a first shader kernel associated with the first ML primitive and incurring a second kernel launch penalty for launching a second shader kernel associated with the second ML primitive, disclosed techniques incur a kernel launch latency associated with launching the fused shader kernel associated with the first ML primitive and the second ML primitive.

In some examples, when the graphics driver 216 receives the request to finalize the command buffer 232, the graphics driver 216 may trigger the fusion component 218 to parse the ML primitives of the command buffer 232 to identify one or more opportunities for improving execution of the ML primitives. For example, the fusion component 218 may be configured to query the ML library 220 using sequential ML primitives of the command buffer 232 to determine whether the sequential ML primitives may be replaced with a fused shader kernel. In some such examples, the fusion component 218 may replace the sequential ML primitives of the command buffer 232 with the fused shader kernel (or a command to execute the fused shader kernel).

In some examples, the fusion component 218 may parse the ML primitives of the command buffer 232 to determine whether output data generated by a first ML primitive is used as input data by a second ML primitive that is executed back-to-back with the first ML primitive. In some such examples, the fusion component 218 may be configured to query the ML library 220 to determine whether the identified ML primitives may be replaced with shader kernels that enable storing of output data to the local memory (e.g., the GPU memory 246) and/or enable reading of input data from the local memory. For example, the fusion component 218 may replace the first ML primitive with a first shader kernel that executes the tasks or functions associated with the first ML primitive and that writes output data generated by the respective tasks or functions to the local memory (e.g., the GPU memory 246). The example fusion component 218 may also replace the second ML primitive with a second shader kernel that reads input data from the local memory (e.g., the GPU memory 246) and that executes the tasks or functions associated with the second ML primitive using the input data from the local memory.

In some examples, after the fusion component 218 has parsed and replaced the ML primitives of the command buffer 232 with fused shader kernels, the graphics driver 216 may then replace any remaining ML primitives with shader kernels. For example, the graphics driver 216 may parse the entries of the command buffer 232 and identify any ML primitives that were not replaced with a fused shader kernel. The graphics driver 216 may then replace any such identified ML primitives with shader kernels that execute the tasks or functions associated with the respective ML primitive.

In some examples, after the ML primitives of the command buffer 232 have been replaced with fused shader kernels or shader kernels, the graphics driver 216 may dispatch the fused command buffer 232 to the graphics processor 240 for execution. For example, the graphics driver 216 may notify the graphics processor 240 that the fused command buffer 232 corresponding to the application 212 is available for processing. In some examples, the graphics driver 216 may write to a graphics processor register (e.g., a register polled by the graphics processor 240 and/or a memory-mapped register polled by the graphics processor 240) one or more values indicating that the fused command buffer 232 is ready for execution.

Thus, it should be appreciated that the fusion component 218 may perform the parsing and replacing of ML primitives with fused shader kernels during a window created between the receiving of the request to finalize the command buffer 232 and the dispatching of the fused command buffer 232 to the graphics processor 240. In some examples, the fusion component 218 may be configured to perform the fusion of ML primitives as part of the closing of the command buffer 232. For example, the graphics driver 216 may trigger the fusion component 218 to parse the command buffer 232 while closing and saving the command buffer 232. In some examples, the fusion component 218 may be configured to perform the fusion of ML primitives after the graphics driver 216 closes the command buffer 232 (e.g., stops recording commands to the command buffer 232) and before the fused command buffer 232 is dispatched to the graphics processor 240.

In the illustrated example of FIG. 2, the memory 230 is a global memory (sometimes referred to as a "system memory" or a "shared memory") that is accessible to the application processor 210 and the graphics processor 240. For example, a component executing via the application processor 210 may be configured to write data to the memory 230 and/or read data from the memory 230. Additionally, a component of the graphics processor 240 may be configured to write data to the memory 230 and/or read data from the memory 230.

In the illustrated example, the memory 230 includes the command buffer 232 and the ML data buffer 234. The command buffer 232 may be configured to record one or more ML primitives received from the application processor 210. The command buffer 232 may also be configured to store fused shader kernels and non-fused shader kernels (and/or commands to execute the respective shader kernels) that correspond to the one or more ML primitives received from the application processor 210. The example ML data buffer 234 may be configured to store data used for executing the shader kernels and/or to store data generated by the executing of the shader kernels. For example, the application processor 210 may store input data used for executing an ML primitive in the ML data buffer 234. The graphics processor 240 may read input data stored in the ML data buffer 234 to execute a shader kernel and may also store output data generated by the executing of the shader kernel in the ML data buffer 234. It should be appreciated that in some examples, the application processor 210 may also read the output data generated by the executing of the shader kernel from the ML data buffer 234.

In the illustrated example of FIG. 2, the graphics processor 240 includes the command engine 242, one or more processing element(s) 244, and GPU memory 246. In some examples, the command engine 242, the one or more processing units 244, and the GPU memory 246 may be configured to implement aspects of an example ML processing pipeline.

In the illustrated example, the command engine 242 may receive the fused command buffer 232 and configure the processing elements 244 to perform various operations for carrying out the shader kernels of the fused command buffer 232. As mentioned above, the command engine 242 and the processing elements 244 may be configured to implement aspects of an example ML processing pipeline.

In the illustrated example, the processing elements 244 may include one or more processing units (sometimes referred to as "shaders," "shader processors," or "shader cores"), each of which may be a programmable processing unit or a fixed-function processing unit. A programmable processing unit may include, for example, a programmable shader unit that is configured to execute one or more shader kernels that are downloaded onto the graphics processor 240 from the application processor 210. In some examples, a shader kernel may be a compiled version of a program written in a shading language. In some examples, the programmable shader units may include compute shader units for executing tasks or functions corresponding to ML primitives.

A fixed-function processing unit may include hardware that is hard-wired to perform certain functions. It should be appreciated that in some examples, the fixed-function processing unit may additionally or alternatively include freely programmable shader-controlled pipelines that may enable the fixed-function processing unit to perform some configurable functions. Although the fixed-function processing unit may be configurable to perform different functions (e.g., via one or more control signals), the fixed-function hardware may not include a program memory that is capable of received user-compiled programs (e.g., from the graphics driver 216).

It should be appreciated that the processing elements 244 allow for parallelization, which is why executing ML primitives via the graphics processor 240 may be useful. For example, each processing element 244 of the graphics processor 240 may be configured to execute the same operations, but on different data. In this way, the parallel-processing structure of the processing elements 244 allows the graphics processor 240 to perform many operations in parallel (e.g., at the same time), which may be useful in accelerating an ML primitive.

In general, a shader kernel may cause the graphics processor 240 to execute tasks or functions associated with an ML primitive. In some such examples, once the graphics processor 240 receives the shader kernel (e.g., from the fused command buffer 232), control may be passed to the graphics processor 240 for launching one or more shader kernels for accelerating the respective ML primitives.

In some examples, the graphics processor may access ML data from the ML data buffer 234 when executing each of the launched shader kernels. For example, when launching each of the shader kernels (e.g., the fused shader kernels and/or the non-fused shader kernels), the graphics processor 240 may access ML data from the ML data buffer 234 at the memory 230 for performing each of the respective shader kernels, perform the respective shader kernels, and then write the output of each of the respective shader kernels to the memory 230. However, it should be appreciated that reading from the memory 230 and/or writing to the memory 230 may be associated with a memory latency due to, for example, the memory bandwidth associated with the memory 230, due to traffic on the bus 202, etc. In some examples, this general memory latency associated with accessing data (e.g., the delay between when reading data from and/or writing data to is needed and when the respective operation is completed) at the memory 230 may result in decreased performance and increased power usage when executing a shader kernel.

In the illustrated example of FIG. 2, the graphics processor 240 includes a GPU memory 246 (GMEM) that is directly coupled to the graphics processor 240 so that the graphics processor 240 may read data from and/or write data to the GPU memory 246 without using the bus 202. Thus, the graphics processor 240 may process data locally using a local storage (e.g., the GPU memory 246) without using an off-chip memory (e.g., the memory 230). For example, the GPU memory 246 may be an on-chip memory that is on-chip with the graphics processor 240 and in relatively close proximity with components of the graphics processor 240, and may be associated with a dedicated memory bus within the graphics processor 240. In contrast, to access data stored in the memory 230, the graphics processor 240 may have to share a memory bus with other components of the device 200 (e.g., the application processor 210), which may result in a more limited available bandwidth.

As described above, in some examples, execution of a shader kernel may cause output data or an intermediate result to be stored in a local memory. For example, the processing element 244 may execute a shader kernel and store the output data in the GPU memory 246. In some such examples, executing the next shader kernel may cause the processing element 244 to read the data from the GPU memory 246, rather than from the memory 230, which facilities reducing memory access latency associated with executing the shader kernel and the corresponding ML primitives.

Figure 3:
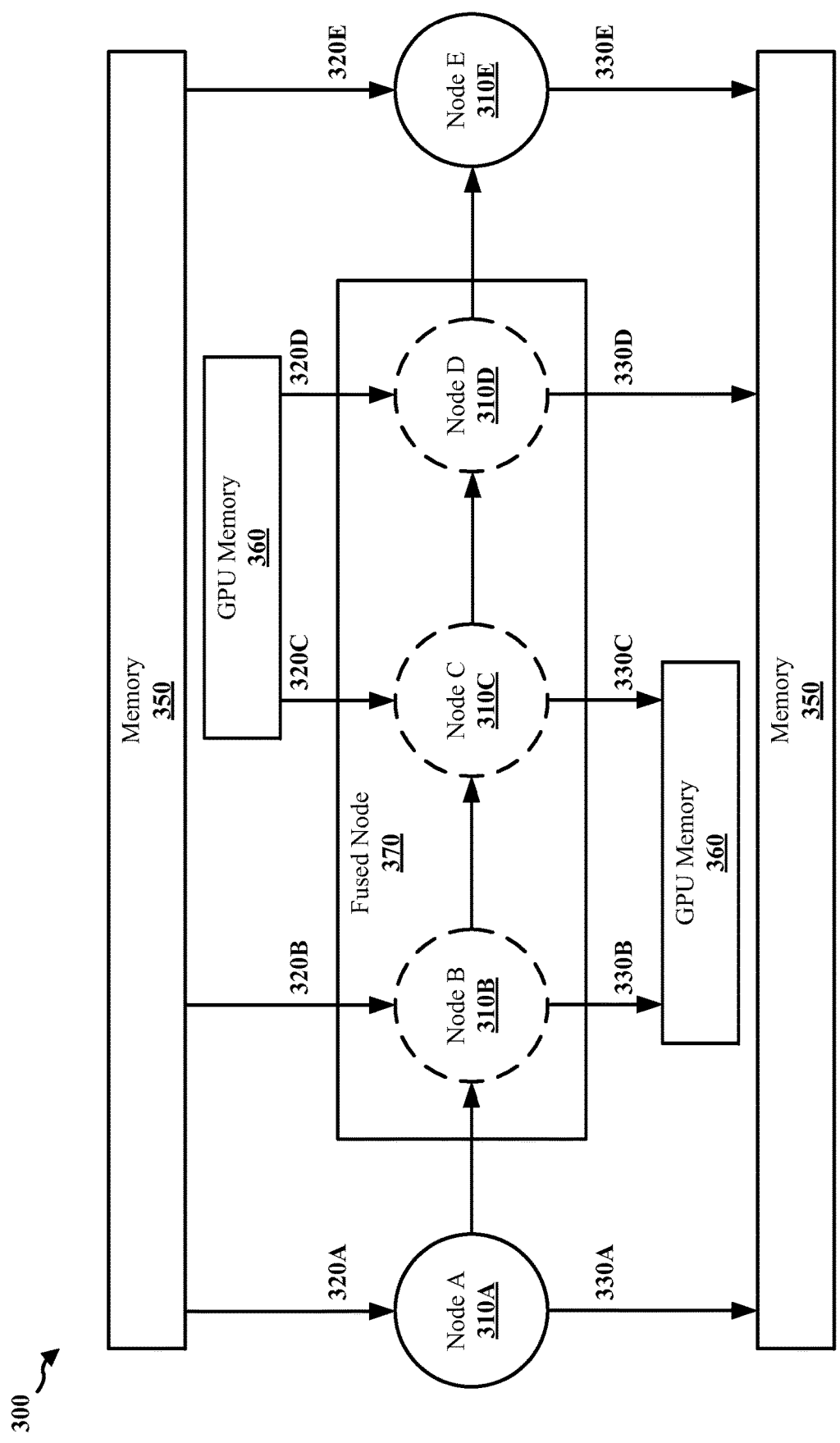
FIG. 3 depicts another example graph structure representing another sequence of nodes representing the example machine learning primitives of FIG. 1, in accordance with one or more techniques of this disclosure.

FIG. 3 illustrates an example graph structure 300 depicting a sequence of ML primitives that may be accelerated via a graphics processor. In the illustrated example of FIG. 3, the graph structure 300 includes five example nodes A, B, C, D, E, which may be referred to as nodes 310A to 310E, respectively. As shown in FIG. 3, each of the nodes 310A to 310E receives respective input data 320A to 320E and generates respective output data 330A to 330E.

In the illustrated example, each node 310 represents an ML primitive. Furthermore, the tasks or functions associated with each node 310 may be the same as the corresponding node 110 of FIG. 1. For example, executing the first node 310A of FIG. 3 may include the graphics processor receiving input data 320A, performing the one or more operations associated with a respective shader kernel, and generating output data 330A. Similarly, executing the first node 110A of FIG. 1 may include the graphics processing the input data 110A that is the same as the input data 320A, performing the same one or more operations, and generating output data 130A that is the same as the output data 330A. Furthermore, as shown in FIG. 3, the execution of the nodes 310 is performed in sequence (e.g., back-to-back).

In the illustrated example of FIG. 3, certain of the ML primitives have been replaced with a fused ML primitive. For example, the second node 310B, the third node 310C, and the fourth node 310D have been replaced by a fused node 370. As shown in FIG. 3, the fused node 370 implements the operations associated with the second node 310B, the third node 310C, and the fourth node 310D. It should be appreciated that the operations associated with the fused node 370 may be mapped at the ML library 220 to the operations associated with the second node 310B, the third node 310C, and the fourth node 310D. For example, the fusion component 218 of FIG. 2 may parse the ML primitives of a command buffer, query the ML library 220 using the sequential nodes 310B, 310C, 310D, and map the respective nodes 310B, 310C, 310D to the fused node 370.

Thus, instead of launching five shader kernels associated with the five ML primitives (as shown in FIG. 1), in the illustrated example of FIG. 3, three shader kernels (e.g., the first node 310A, the fused node 370, and the fifth node 310E may be launched. It should be appreciated that launching three shader kernels (as shown in FIG. 3) may incur a relatively lower kernel launch latency than launching five shader kernels (as shown in FIG. 1), and, thus, may facilitate improving execution of ML primitives.

In the illustrated example of FIG. 3, executing the first node 310A and the fifth node 310E includes receiving input data 320A, 320E from memory 350 and storing output data 330A, 330E at the memory 350. Aspects of the memory 350 may be implemented by the memory 230 of FIG. 2. However, executing the fused node 370 includes accessing some data from the memory 350 and other data from a GPU memory 360. Aspects of the GPU memory 360 may be implemented by the GPU memory 246 of FIG. 2.

As shown in FIG. 3, executing the operations associated with the second node 310B include reading input data 320B from the memory 350 and storing output data 330B at the GPU memory 360. Executing the operations associated with the third node 310C include reading input data 320C from the GPU memory 360 and storing output data 330C at the GPU memory 360. Executing the operations associated with the fourth node 310D include reading input data 320D from the GPU memory 360 and storing output data 330D at the memory 350. In some such examples, instead of incurring the relatively longer memory access latencies associated with accessing data at the memory 350, executing the fused node 370 includes reading input data 320C, 320D from the GPU memory 360 and writing output data 330B, 330C to the GPU memory 360. It should be appreciated that the data 320C, 320D, 330B, 330C accessed from the GPU memory 360 may correspond to intermediate results generating during the execution of the fused node 370. As described above, accessing (e.g., reading from and/or writing to) data from a local memory (e.g., the GPU memory 360) may be associated with a relatively smaller memory access latency than accessing data from a global memory (e.g., the memory 350). Thus, by storing the intermediate results 320C, 320D, 330B, 330C in the GPU memory 360, access to the intermediate results 320C, 320D, 330B, 330C may be performed relatively faster than accessing the data from the memory 350, which may facilitate improving execution of the ML primitives.

Figure 4:
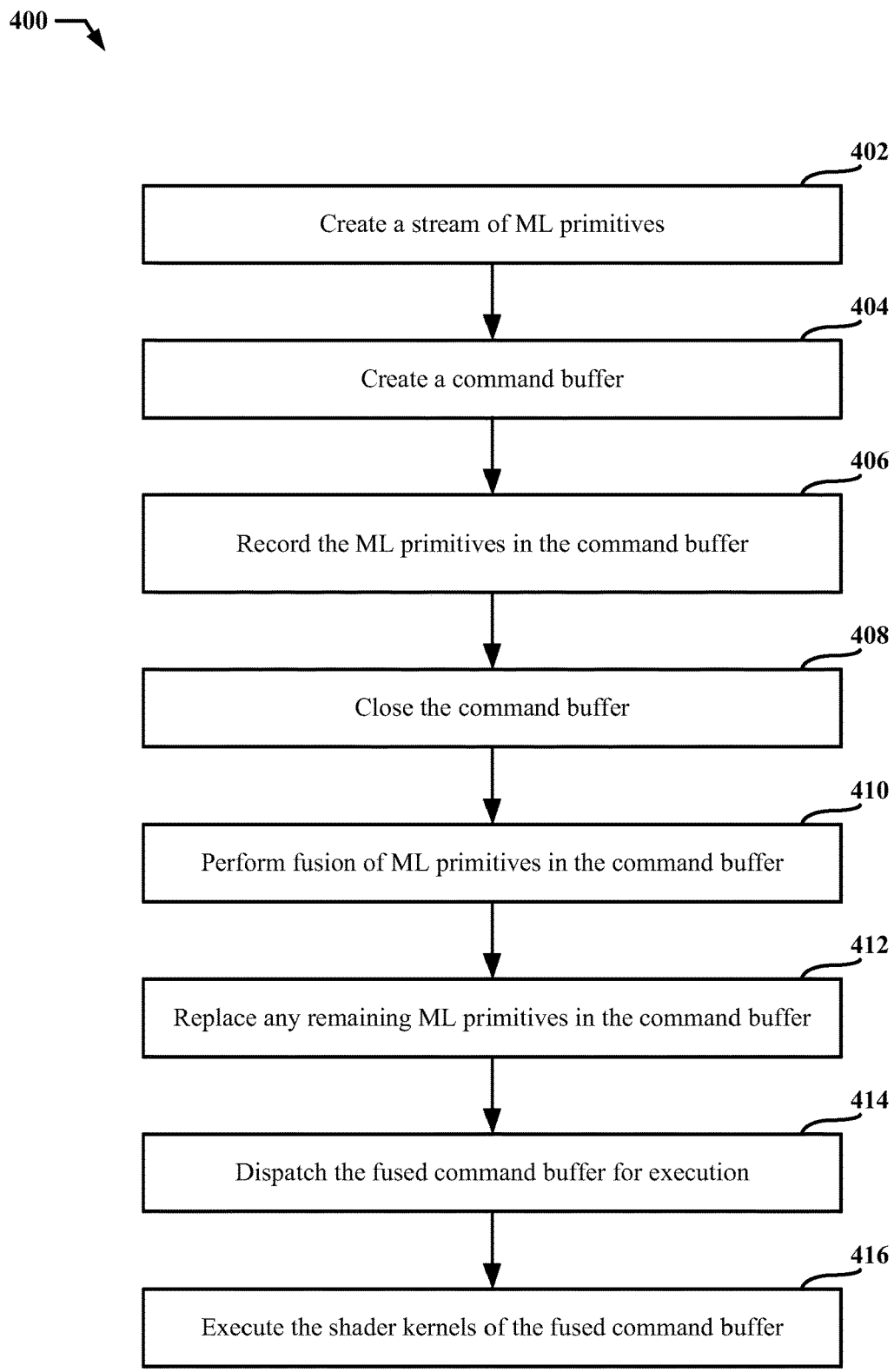
FIG. 4 illustrates an example flowchart of an example method, in accordance with one or more techniques of this disclosure.

FIG. 4 illustrates an example flowchart 400 of an example method in accordance with one or more techniques of this disclosure. The method may be performed by an apparatus, such as the example device 200 of FIG. 2 and/or a component of the device 200, such as the example application processor 210, the example application 212, the example ML framework 214, the example graphics driver 216, the example fusion component 218, the example graphics processor 240, the example command buffer 242, and/or the example processing element(s) 244.

At 402, the apparatus may create a stream of ML primitives, as described in connection with the examples of FIGS. 1, 2, 3, and/or 5. For example, the application 212 may issue commands that cause the graphics processor 240 to perform one or more operations associated with respective ML primitives. In some examples, the ML framework 214 may receive the commands from the application 212 and translate the received commands into a format that is consumable by the graphics driver 216 for providing to the graphics processor 240. In some examples, the ML framework may employ techniques for combining two or more commands issued by the application 212 into an ML primitive.

At 404, the apparatus may create a command buffer, as described in connection with the examples of FIGS. 1, 2, 3, and/or 5. For example, the graphics driver 216 may open the command buffer 232 associated with the application 212 at the memory 230.

At 406, the apparatus may record the ML primitives in the command buffer, as described in connection with the examples of FIGS. 1, 2, 3, and/or 5. For example, the graphics driver 216 may record (or store) the stream of ML primitives at the command buffer 232.

At 408, the apparatus may close the command buffer, as described in connection with the examples of FIGS. 1, 2, 3, and/or 5. For example, the application 212 may issue a request to close the command buffer 232. The graphics driver 216 may receive the request to close the command buffer 232 and may stop recording commands to the command buffer 232.

At 410, the apparatus may perform fusion of ML primitives, as described in connection with the examples of FIGS. 1, 2, 3, and/or 5. For example, the fusion component 218 may parse the ML primitives recorded in the command buffer 232 and identify two or more ML primitives that may be replaced with a fused shader kernel. In some examples, the fusion component 218 may be configured to use two or more sequential ML primitives to query the ML library 220 to determine whether the ML library 220 includes a mapping for a fused shader kernel based on the two or more sequential ML primitives. In some such examples, the fusion component 218 may be configured to store, in the command buffer 232, the fused shader kernel (or a command to execute the fused shader kernel) that corresponds to the two or more sequential ML primitives.

In some examples, the fusion component 218 may be configured to parse the ML primitives of the command buffer 232 to determine whether memory access operations associated with two or more sequential ML primitives may be improved by changing a memory access location from a global memory (e.g., a first memory) to a local memory (e.g., a second memory). For example, the fusion component 218 may determine that an output of a first ML primitive is used an input for a following second ML primitive. In some such examples, the fusion component 218 may be configured to change the storage location of the output generated by the executing of the first ML primitive from the ML data buffer 234 of the memory 230 (e.g., the first memory) to the GPU memory 246 (e.g., the second memory). For example, the fusion component 218 may change the storage location of the output generated by the executing of the first ML primitive to a buffer of the GPU memory 246. Additionally, the fusion component 218 may be configured to change the read location of the input used for executing the second ML primitive from the ML data buffer 234 of the memory 230 to the GPU memory 246.

At 412, the apparatus may replace (or substitute) any remaining ML primitives in the command buffer with shader kernels, as described in connection with the examples of FIGS. 1, 2, 3, and/or 5. For example, the graphics driver 216 (and/or the fusion component 218) may parse the command buffer 232 to determine whether there are any ML primitives remaining (e.g., any ML primitives recorded in the command buffer 232 that were not replaced with a fused shader kernel (at 410)). The graphics driver 216 (and/or the fusion component 218) may store respective non-fused shader kernels in the command buffer 232 that correspond to any identified ML primitives. Thus, it should be appreciated that the command buffer 232 may include fused shader kernels and non-fused shader kernels that correspond to the ML primitives that were recorded in the command buffer 232 when the request to close the command buffer 232 was received from the application 212, and may be generally referred to as a "fused command buffer."

It should be appreciated that the parsing of the ML primitives recorded in the command buffer 232 to identify the two or more ML primitives that may be replaced with a fused shader kernel (at 410) may be referred to as a first traversal (or "pass through") of the ML primitives recorded in the command buffer 232 by the graphics driver 216 (and/or the fusion component 218). Furthermore, it should be appreciated that the parsing of the ML primitives recorded in the command buffer 232 to identify any remaining ML primitives (at 412) may be referred to as a second traversal (or pass through) of the ML primitives recorded in the command buffer 232 by the graphics driver 216 (and/or the fusion component 218).

At 414, the apparatus may dispatch the fused command buffer for execution, as described in connection with the examples of FIGS. 1, 2, 3, and/or 5. For example, the graphics driver 216 may signal to the graphics processor 240 that the fused command buffer 232 is available for processing after performing the first traversal and the second traversal to replace the ML primitives of the command buffer 232 with respective fused shader kernels and/or non-fused shader kernels.

At 416, the apparatus may execute the shader kernels of the fused command buffer, as described in connection with the examples of FIGS. 1, 2, 3, and/or 5. For example, the graphics processor 240 may execute the fused shader kernels and the non-fused shader kernels included in the fused command buffer 232. In some examples, the command engine 242 may configure the processing element 244 to execute a shader kernel (e.g., a fused shader kernel or a non-fused shader kernel). In some examples, the processing element 244 may access input data and/or output data from the memory 230 (e.g., the ML data buffer 234) to execute a shader kernel. In some examples, the processing element 244 may access input data and/or output data from the GPU memory 246 to execute a shader kernel.

Figure 5:
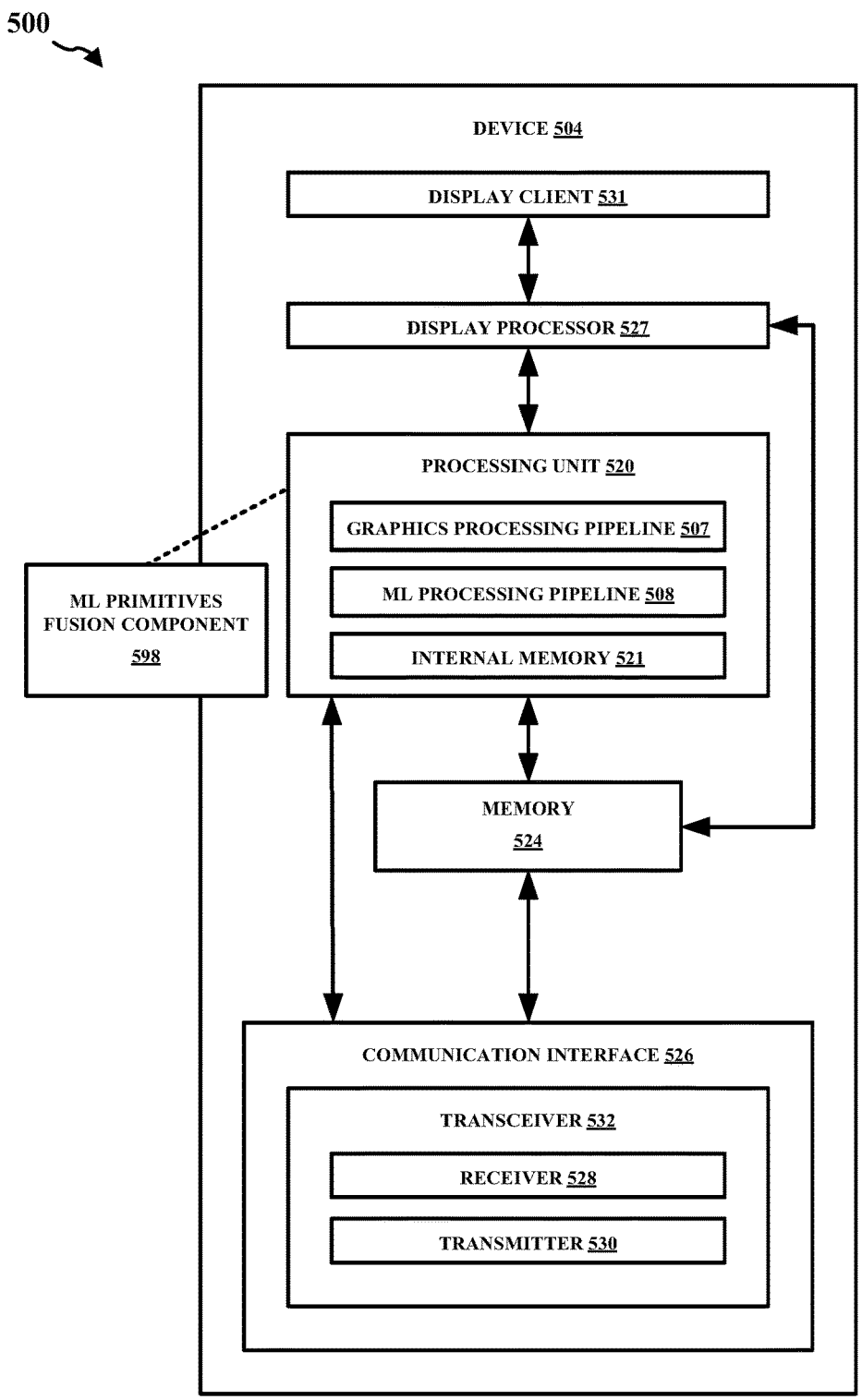
FIG. 5 is a block diagram that illustrates an example content generation system, in accordance with one or more techniques of this disclosure.

FIG. 5 is a block diagram that illustrates an example content generation system 500 configured to implement one or more techniques of this disclosure. The content generation system 500 includes a device 504. The device 504 may include one or more components or circuits for performing various functions described herein. Aspects of the device 504 may be implemented by the example device 200 of FIG. 2. In some examples, one or more components of the device 504 may be components of an SOC. The device 504 may include one or more components configured to perform one or more techniques of this disclosure. In the example shown, the device 504 includes a processing unit 520 and a memory 524. In some examples, the device 504 can include a number of additional or alternative components, such as a communication interface 526, a transceiver 532, a receiver 528, a transmitter 530, a display processor 527, and a display client 531.

In the illustrated example of FIG. 5, the processing unit 520 includes an internal memory 521. Aspects of the internal memory 521 may be implemented by the example GPU memory 246 of FIG. 2. The processing unit 520 may be configured to perform graphics processing, such as in a graphics processing pipeline 507. The processing unit 520 may also be configured to perform ML processing, such as in an ML processing pipeline 508. In some examples, the device 504 may include a display processor, such as the display processor 527, to perform one or more display processing techniques on one or more frames generated by the processing unit 520 before presentment by the display client 531. The display processor 527 may be configured to perform display processing. For example, the display processor 527 may be configured to perform one or more display processing techniques on one or more frames generated by the processing unit 520.

Reference to the display client 531 may refer to one or more displays. For example, the display client 531 may include a single display or multiple displays. The display client 531 may include a first display and a second display. In further examples, the results of the graphics processing may not be displayed on the device (e.g., the first and second displays may not receive any frames for presentment thereon). Instead, the frames or graphics processing results may be transferred to another device. The display client 531 may be configured to display or otherwise present frames processed by the display processor 527. In some examples, the display client 531 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 520, such as the memory 524, may be accessible to the processing unit 520. For example, the processing unit 520 may be configured to read from and/or write to external memory, such as the memory 524. The processing unit 520 may be communicatively coupled to the memory 524 over a bus, such as the example bus 202 of FIG. 2. In some examples, the processing unit 520 and the memory 524 may be communicatively coupled to each other over the bus or a different connection. Aspects of the memory 524 may be implemented by the example memory 230 of FIG. 2.

It should be appreciated that in some examples, the device 504 may include a content encoder/decoder configured to receive graphical and/or display content from any source, such as the memory 524 and/or the communication interface 526. The memory 524 may be configured to store received encoded or decoded content. In some examples, the content encoder/decoder may be configured to receive encoded or decoded content (e.g., from the memory 524 and/or the communication interface 526) in the form of encoded or decoded pixel data. In some examples, the content encoder/decoder may be configured to encode or decode any content.

The internal memory 521 or the memory 524 may include one or more volatile or non-volatile memories or storage devices. In some examples, the internal memory 521 or the memory 524 may include RAM, SRAM, DRAM, erasable programmable ROM (EPROM), electrically erasable programmable ROM (EEPROM), flash memory, a magnetic data media or an optical storage media, or any other type of memory.

The internal memory 521 or the memory 524 may be a non-transitory storage medium according to some examples. The term "non-transitory" may indicate that the storage medium is not embodied in a carrier wave or a propagated signal. However, the term "non-transitory" should not be interpreted to mean that the internal memory 521 or the memory 524 is non-movable or that its contents are static. As one example, the memory 524 may be removed from the device 504 and moved to another device. As another example, the memory 524 may not be removable from the device 504.

The processing unit 520 may be an application processor, a central processing unit (CPU), a graphics processor, a graphics processing unit (GPU), a general purpose GPU (GPGPU), or any other processing unit that may be configured to perform system processing, such as graphics processing, compute processing, etc. For example, aspects of the application processor 210 and/or the graphics processor 240 may be implemented by the processing unit 520. In some examples, the processing unit 520 may be integrated into a motherboard of the device 504. In some examples, the processing unit 520 may be present on a graphics card that is installed in a port in a motherboard of the device 504, or may be otherwise incorporated within a peripheral device configured to interoperate with the device 504. The processing unit 520 may include one or more processors, such as one or more microprocessors, CPUs, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 520 may store instructions for the software in a suitable, non-transitory computer-readable storage medium (e.g., the internal memory 521 and/or the memory 524) and may execute the instructions in hardware using one or more processors to perform the techniques of this disclosure. Any of the foregoing, including hardware, software, a combination of hardware and software, etc., may be considered to be one or more processors.

In some aspects, the content generation system 500 can include a communication interface 526. The communication interface 526 may include a receiver 528 and a transmitter 530. The receiver 528 may be configured to perform any receiving function described herein with respect to the device 504. Additionally, the receiver 528 may be configured to receive information (e.g., eye or head position information, rendering commands, and/or location information) from another device. The transmitter 530 may be configured to perform any transmitting function described herein with respect to the device 504. For example, the transmitter 530 may be configured to transmit information to another device, which may include a request for content. The receiver 528 and the transmitter 530 may be combined into a transceiver 532. In such examples, the transceiver 532 may be configured to perform any receiving function and/or transmitting function described herein with respect to the device 504.

It should be appreciated that while shown as separate components in FIG. 5, in some examples, the display client 531 (sometimes referred to as a "display panel") may include the display processor 527. Furthermore, in some examples, the processing unit 520 may include the display processor 527.

Referring again to FIG. 5, in certain aspects, the processing unit 520 may be configured to perform ML primitive fusion techniques disclosed herein. In the illustrated example of FIG. 5, the processing unit 520 may include ML primitives fusion component 598 configured to facilitate acceleration of ML primitives via fusion of two or more ML primitives. Aspects of the ML primitives fusion component 598 may be implemented by the device 200 of FIG. 2.

For example, the ML primitives fusion component 598 may be configured to store a command stream generated by an application in a buffer, the command stream including a plurality of machine learning primitives for execution by a graphics processor. The example ML primitives fusion component 598 may also be configured to identify, after receiving a request from the application to finalize the buffer, two or more machine learning primitives of the buffer that may be replaced with a fused shader kernel. The example ML primitives fusion component 598 may also be configured to store the fused shader kernel in the buffer to generate a fused command buffer.

In some examples, the example ML primitives fusion component 598 may be configured to parse the plurality of machine learning primitives of the buffer, where the parsing of the plurality of machine learning primitives includes identifying, for each machine learning primitive of the plurality of machine learning primitives, a respective input to load from a first memory, where each respective input maps to a respective output and each respective input is used to generate the respective output by performing a respective operation, and where each respective output is stored at the first memory after execution of the respective machine learning primitive. Additionally, the example ML primitives fusion component 598 may be configured to identify a sequence of two or more machine learning primitives of the plurality of machine learning primitives that map to a fused shader kernel based on the respective inputs and the respective outputs of sequential machine learning primitives of the buffer. In some examples, the example ML primitives fusion component 598 may be configured to store a command to execute the fused shader kernel in the fused command buffer, where the fused shader kernel corresponds to the identified sequence of two or more machine learning primitives.

In some examples, the example ML primitives fusion component 598 may be configured to query a machine learning library using the sequence of two or more machine learning primitives. Additionally, the example ML primitives fusion component 598 may be configured to determine that the sequence of two or more machine learning primitives map to the fused shader kernel while querying the machine learning library.

In some examples, the example ML primitives fusion component 598 may be configured to parse the plurality of machine learning primitives of the buffer, where the parsing of the plurality of machine learning primitives includes identifying, for each machine learning primitive of the plurality of machine learning primitives, a respective input to load from a first memory, where each respective input maps to a respective output and each respective input is used to generate the respective output by performing a respective operation, and where each respective output is stored at the first memory after execution fo the respective machine learning primitive. Additionally, the example ML primitives fusion component 598 may be configured to identify that a mapped output of a first machine learning primitive of the plurality of machine learning primitives is an input of a second machine learning primitive of the plurality of machine learning primitives, where the first machine learning primitive and the second machine learning primitive are sequential operations within the buffer, and where the first machine learning primitive is executed prior to the second machine learning primitive.

In some examples, the example ML primitives fusion component 598 may be configured to change a storage location to store the output of the first machine learning primitive, when executed, from the first memory to a second memory different than the first memory. Additionally, the example ML primitives fusion component 598 may be configured to load the output from the second memory as the input of the second machine learning primitive during execution of the second machine learning primitive.

In some examples, the example ML primitives fusion component 598 may be configured to dispatch the fused command buffer to a graphics processor for execution.

In some examples, the example ML primitives fusion component 598 may be configured to store a fused shader kernel or a non-fused shader kernel corresponding to each machine learning primitive in the buffer to generate the fused command buffer.

As described herein, a device, such as the device 504, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., an application processor), but, in further embodiments, can be performed using other components (e.g., a graphics processor), consistent with disclosed embodiments.

In one configuration, a method or apparatus for machine learning processing is provided. The apparatus may be a processing unit, an application processor, a graphics processor, a GPU, a display processor, a DPU, a video processor, or some other processor that can perform machine learning processing. In some examples, the apparatus may be the processing unit 520 within the device 504, or may be some other hardware within the device 504, or another device, such as the example device 200 of FIG. 2.

The apparatus may include means for buffering a command stream generated by an application, the command stream including a plurality of machine learning primitives for execution by a graphics processor. The apparatus may also include means for identifying two or more machine learning primitives of the buffered command stream that may be replaced via a fused shader kernel after receiving a request from the application to finalize the buffered command stream. The apparatus may also include means for replacing the identified two or more machine learning primitives with the fused shader kernel to generate a fused command buffer. The apparatus may also include means for parsing the plurality of machine learning primitives of the buffered command stream, where the parsing of the plurality of machine learning primitives includes identifying, for each machine learning primitive of the plurality of machine learning primitives, a respective input to load from a first memory, where each respective input is used to generate a respective output by performing a respective operation, and where each respective output is stored at the first memory. The apparatus may also include means for identifying a sequence of two or more machine learning primitives of the plurality of machine learning primitives that map to a fused shader kernel. The apparatus may also include means for replacing the identified two or more machine learning primitives with a command to execute the fused shader kernel in the fused command buffer. The apparatus may also include means for querying a machine learning library using the sequence of two or more machine learning primitives. The apparatus may also include means for determining that the sequence of two or more machine learning primitives map to the fused shader kernel while querying the machine learning library. The apparatus may also include means for parsing the plurality of machine learning primitives of the buffered command stream, where the parsing of the plurality of machine learning primitives includes identifying, for each machine learning primitive of the plurality of machine learning primitives, a respective input to load from a first memory, where each respective input is used to generate a respective output by performing a respective operation, and where each respective output is stored at the first memory. The apparatus may also include means for identifying an output of a first machine learning primitive of the plurality of machine learning primitives is an input of a second machine learning primitive of the plurality of machine learning primitives, where the first machine learning primitive and the second machine learning primitive are sequential operations within the buffered command stream, and where the first machine learning primitive is executed prior to the second machine learning primitive. The apparatus may also include means for storing the output of the first machine learning primitive at a second memory different than the first memory. The apparatus may also include means for loading the output from the second memory as the input of the second machine learning primitive during execution of the second machine learning primitive. The apparatus may also include means for dispatching the fused command buffer to a graphics processor for execution. The apparatus may also include means for replacing each machine learning primitive of the buffered command stream with a fused shader kernel or a non-fused shader kernel.

The subject matter described herein can be implemented to realize one or more benefits or advantages. For instance, the described machine learning processing techniques can be used by an application processor, a CPU, a graphics processor, a GPU, a display processor, a DPU, or a video processor or some other processor that can perform ML primitives fusion techniques disclosed herein. Moreover, the machine learning processing techniques herein can improve or speed up data processing or execution. Further, the machine learning processing techniques herein can improve resource or data utilization and/or resource efficiency. For example, aspects of the present disclosure can reduce kernel launch latency, read memory latency, and/or write memory latency of a processing unit.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of machine learning processing, comprising:
storing a command stream generated by an application in a buffer, the command stream including a plurality of machine learning primitives for execution by a graphics processor;
identifying, after receiving a request from the application to finalize the buffer, two or more machine learning primitives of the buffer that may be replaced with a fused shader kernel; and
storing the fused shader kernel in the buffer to generate a fused command buffer.

2. The method of claim 1, wherein the identifying of the two or more machine learning primitives of the buffer comprises:
parsing the plurality of machine learning primitives of the buffer, wherein the parsing of the plurality of machine learning primitives includes identifying, for each machine learning primitive of the plurality of machine learning primitives, a respective input to load from a first memory, wherein each respective input maps to a respective output, and each respective input is used to generate the respective output by performing a respective operation, and wherein each respective output is stored at the first memory after execution of the respective machine learning primitive; and
identifying a sequence of two or more machine learning primitives of the plurality of machine learning primitives that map to a fused shader kernel based on the respective inputs and the respective outputs of sequential machine learning primitives of the buffer.

3. The method of claim 2, wherein the storing of the fused shader kernel comprises:
storing a command to execute the fused shader kernel in the fused command buffer, the fused shader kernel corresponding to the identified sequence of two or more machine learning primitives.

4. The method of claim 2, wherein the identifying of the sequence of two or more machine learning primitives comprises:
querying a machine learning library using the sequence of two or more machine learning primitives; and
determining that the sequence of two or more machine learning primitives map to the fused shader kernel while querying the machine learning library.

5. The method of claim 4, wherein the machine learning library comprises at least the fused shader kernel and a non-fused shader kernel.

6. The method of claim 4, wherein the machine learning library includes pre-compiled shader kernels.

7. The method of claim 4, wherein the machine learning library includes mappings between machine learning primitives and shader kernels that are based on a characteristic of the graphics processor.

8. The method of claim 4, wherein the machine learning library includes mappings to shader kernels that include low-level code for execution by the graphics processor.

9. The method of claim 1, wherein the identifying of the two or more machine learning primitives of the buffer comprises:
parsing the plurality of machine learning primitives of the buffer, wherein the parsing of the plurality of machine learning primitives includes identifying, for each machine learning primitive of the plurality of machine learning primitives, a respective input to load from a first memory, wherein each respective input maps to a respective output, and each respective input is used to generate the respective output by performing a respective operation, and wherein each respective output is stored at the first memory after execution of the respective machine learning primitive; and
identifying that a mapped output of a first machine learning primitive of the plurality of machine learning primitives is an input of a second machine learning primitive of the plurality of machine learning primitives, wherein the first machine learning primitive and the second machine learning primitive are sequential operations within the buffer, and wherein the first machine learning primitive is executed prior to the second machine learning primitive.

10. The method of claim 9, further comprising:
changing a storage location to store the output of the first machine learning primitive, when executed, from the first memory to a second memory different than the first memory; and
loading the output from the second memory as the input of the second machine learning primitive during execution of the second machine learning primitive.

11. The method of claim 10, wherein the first memory is associated with a first latency, and the second memory is associated with a second latency less than the first latency.

12. The method of claim 1, further comprising dispatching the fused command buffer to the graphics processor for execution.

13. The method of claim 1, further comprising storing a fused shader kernel or a non-fused shader kernel corresponding to each machine learning primitive in the buffer to generate the fused command buffer.

14. An apparatus for machine learning processing, comprising:
a memory; and
at least one processor coupled to the memory and configured to:
store a command stream generated by an application in a buffer, the command stream including a plurality of machine learning primitives for execution by a graphics processor;
identify, after receiving a request from the application to finalize the buffer, two or more machine learning primitives of the buffer that may be replaced with a fused shader kernel; and
store the fused shader kernel in the buffer to generate a fused command buffer.

15. The apparatus of claim 14, wherein the at least one processor is configured to identify the two or more machine learning primitives of the buffer by:

parsing the plurality of machine learning primitives of the buffer, wherein the parsing of the plurality of machine learning primitives includes identifying, for each machine learning primitive of the plurality of machine learning primitives, a respective input to load from a first memory, wherein each respective input maps to a respective output, and each respective input is used to generate the respective output by performing a respective operation, and wherein each respective output is stored at the first memory after execution of the respective machine learning primitive; and identifying a sequence of two or more machine learning primitives of the plurality of machine learning primitives that map to a fused shader kernel based on the respective inputs and the respective outputs of sequential machine learning primitives of the buffer.

16. The apparatus of claim 15, wherein the at least one processor is configured to store the fused shader kernel by:
storing a command to execute the fused shader kernel in the fused command buffer, the fused shader kernel corresponding to the identified sequence of two or more machine learning primitives.

17. The apparatus of claim 15, wherein the at least one processor is configured to identify the sequence of two or more machine learning primitives by:
querying a machine learning library using the sequence of two or more machine learning primitives; and
determining that the sequence of two or more machine learning primitives map to the fused shader kernel while querying the machine learning library.

18. The apparatus of claim 17, wherein the machine learning library is configured to include at least the fused shader kernel and a non-fused shader kernel.

19. The apparatus of claim 17, wherein the machine learning library is configured to include pre-compiled shader kernels.

20. The apparatus of claim 17, wherein the machine learning library is configured to include mappings between machine learning primitives and shader kernels that are based on a characteristic of the graphics processor.

21. The apparatus of claim 17, wherein the machine learning library is configured to include mappings to shader kernels that include low-level code for execution by the graphics processor.

22. The apparatus of claim 14, wherein the at least one processor is configured to identify the two or more machine learning primitives of the buffer by:
parsing the plurality of machine learning primitives of the buffer, wherein the parsing of the plurality of machine learning primitives includes identifying, for each machine learning primitive of the plurality of machine learning primitives, a respective input to load from a first memory, wherein each respective input maps to a respective output, and each respective input is used to generate the respective output by performing a respective operation, and wherein each respective output is stored at the first memory after execution of the respective machine learning primitive; and identifying that a mapped output of a first machine learning primitive of the plurality of machine learning primitives is an input of a second machine learning primitive of the plurality of machine learning primitives, wherein the first machine learning primitive and the second machine learning primitive are sequential operations within the buffer, and wherein the first machine learning primitive is executed prior to the second machine learning primitive.

23. The apparatus of claim 22, wherein the at least one processor is further configured to:
change a storage location to store the output of the first machine learning primitive, when executed, from the first memory to second memory different than the first memory; and
loading the output from the second memory as the input of the second machine learning primitive during execution of the second machine learning primitive.

24. The apparatus of claim 23, wherein the first memory is associated with a first latency, and the second memory is associated with a second latency less than the first latency.

25. The apparatus of claim 14, wherein the at least one processor is further configured to dispatch the fused command buffer to a graphics processor for execution.

26. The apparatus of claim 14, wherein the at least one processor is further configured to store a fused shader kernel or a non-fused shader kernel corresponding to each machine learning primitive in the buffer to generate the fused command buffer.

27. The apparatus of claim 14, wherein the apparatus includes a wireless communication device.

28. A non-transitory computer-readable medium storing computer executable code for machine learning processing, comprising code to:
store a command stream generated by an application in a buffer, the command stream including a plurality of machine learning primitives for execution by a graphics processor;
identify, after receiving a request from the application to finalize the buffer, two or more machine learning primitives of the buffer that may be replaced with a fused shader kernel; and
store the fused shader kernel in the buffer to generate a fused command buffer.

* * * * *